United States Patent
Noda et al.

(10) Patent No.: US 9,839,226 B2
(45) Date of Patent: Dec. 12, 2017

(54) METHOD FOR MAKING KABAYAKI-LIKE FISH MEAT PASTE PRODUCT

(71) Applicant: Sugiyo Co., Ltd., Ishikawa (JP)

(72) Inventors: Minoru Noda, Tokyo (JP); Kazuki Tomiyama, Tokyo (JP); Naoki Takamoto, Tokyo (JP); Isamu Yoshino, Ishikawa (JP); Kiyoharu Miyamoto, Ishikawa (JP); Koichi Ueda, Ishikawa (JP); Haruhiko Hamaguti, Ishikawa (JP)

(73) Assignee: SUGIYO CO., LTD., Ishikawa (JP)

( * ) Notice: Subject to any disclaimer, the term of this patent is extended or adjusted under 35 U.S.C. 154(b) by 400 days.

(21) Appl. No.: 14/468,464

(22) Filed: Aug. 26, 2014

(65) Prior Publication Data

US 2015/0064312 A1    Mar. 5, 2015

(30) Foreign Application Priority Data

Aug. 29, 2013    (JP) ................................ 2013-177920

(51) Int. Cl.
*A23L 1/325* (2006.01)
*A23L 17/00* (2016.01)

(52) U.S. Cl.
CPC ............. *A23L 1/3255* (2013.01); *A23L 17/70* (2016.08)

(58) Field of Classification Search
CPC ....................................................... A23L 17/70
USPC ........................................... 426/92, 643, 302
See application file for complete search history.

(56) References Cited

U.S. PATENT DOCUMENTS

| | | | |
|---|---|---|---|
| 2006/0008444 A1* | 1/2006 | Garralda | A01K 85/01 424/84 |
| 2006/0008445 A1* | 1/2006 | Garralda | A01K 85/00 424/84 |
| 2007/0269567 A1* | 11/2007 | McMindes | A23J 3/16 426/540 |
| 2008/0118607 A1* | 5/2008 | Sandoval | A23J 3/14 426/92 |

(Continued)

FOREIGN PATENT DOCUMENTS

| | | |
|---|---|---|
| JP | 59091863 A * | 5/1984 |
| JP | S6075259 | 4/1985 |

(Continued)

OTHER PUBLICATIONS

Office Action dated Jun. 28, 2017 in Japanese Application No. 2013-177920.

(Continued)

*Primary Examiner* — Vera Stulii
(74) *Attorney, Agent, or Firm* — Snell & Wilmer L.L.P.

(57) ABSTRACT

The present invention is related to a fish meat paste product that is soft and highly preferable like the meat of eel in terms of mouth feel and flavor, and a method for making the fish meat paste product. In some embodiments, provided are a spitchcock-like fish meat paste product, comprising: an upper layer, the upper layer comprising fish meat, glucomannan, salt, transglutaminase, an alkaline agent, cooking oil or avocado paste, and spitchcock sauce; and a lower layer, the lower layer comprising fish meat, glucomannan, salt, transglutaminase, an alkaline agent, cooking oil or avocado paste, spitchcock sauce, and squid ink, as well as a method for making the same.

10 Claims, 1 Drawing Sheet

(56) References Cited

U.S. PATENT DOCUMENTS

| | | | | |
|---|---|---|---|---|
| 2008/0254168 A1* | 10/2008 | Mueller | ..................... | A23J 3/16 426/72 |
| 2008/0260913 A1* | 10/2008 | Orcutt | ....................... | A23J 3/16 426/92 |
| 2008/0268112 A1* | 10/2008 | Rolan | ..................... | A23L 13/52 426/250 |
| 2009/0208633 A1* | 8/2009 | Kyed | ........................ | A23J 3/16 426/615 |

FOREIGN PATENT DOCUMENTS

| | | | |
|---|---|---|---|
| JP | 59-113921 | | 12/1985 |
| JP | S60-259162 | | 12/1985 |
| JP | 09028351 A | * | 2/1997 |
| JP | 2001211861 A | * | 8/2001 |
| JP | 2008-255969 | | 4/2010 |
| JP | 2010-81895 | | 4/2010 |
| JP | 2011-246791 | | 5/2013 |
| JP | 2013-102703 | | 5/2013 |
| JP | 2013-102703 A | * | 5/2013 |

OTHER PUBLICATIONS

Office Action dated Mar. 21, 2017 in Japanese Application No. 2013-177920.

* cited by examiner

METHOD FOR MAKING KABAYAKI-LIKE FISH MEAT PASTE PRODUCT

CROSS-REFERENCE TO RELATED APPLICATIONS

This application claims the right of priority to Japanese Application No. 2013-177920 entitled "METHOD. FOR MAKING SPITCHCOCK-LIKE FISH MEAT PASTE PRODUCT," filed on Aug. 29, 2013, which application is incorporated herein by reference.

TECHNICAL FIELD

The present invention relates to a fish meat paste product that has a spitchcock-like taste, mouth feel and external appearance of eel or sea eel, as well as a method for making the fish meat paste product.

BACKGROUND ART

Fish meat paste products are processed food obtained by processing minced fish meat into paste, forming the paste into a desired shape, and heat-processing the paste. There are a variety of types of such products by the difference in shape, heating method and the like.

For example, Patent Document 1 (Japanese Laid-Open Publication No. 60-259162) discloses a technique of: making skin-like tissue meat and meat-like tissue meat, with minced fish meat which was prepared by adding oil, and optionally adding a seasoning, a flavor, a coloring agent and the like; holding the skin-like tissue meat and meat-like tissue meat together to form them into a spitchcock shape to be steamed; and applying a sauce onto the spitchcock shape to be broiled, thereby making a spitchcock-like food. In addition, Patent Document 2 (Japanese Laid-Open Publication No. 2010-81895) discloses a method for making a spitchcock-style fish meat paste product, comprising: making a food paste ingredient containing minced fish meat, a soybean processed product, and oil and fat; heat-processing the formation to be gelatinized; and applying a sauce to and broiling the gel.

Although the products of the above-described Patent Documents are all close to spitchcock in shape, neither of the products are so soft or so preferable as the meat of eel in terms of mouth feel and flavor.

SUMMARY OF THE INVENTION

Technical Problem

An objective of the present invention is to provide a fish meat paste product that is soft and highly preferable like the meat of eel in terms of mouth feel and flavor, and a method for making the fish meat paste product.

Solution to Problem

The present invention is provided to achieve the above-described objective, and the present invention provides a spitchcock-like fish meat paste product, which has a soft mouth feel like an eel meat and which has a favorable flavor, with a minced fish meat-containing glucomannan food ingredient (e.g., Japanese Laid-Open Publication No. 2013-102703), and a method for making the spitchcock-like fish meat paste product. As one skilled in the art will appreciate, the English word "spitchcock" is a translation of the Japanese word "kabayaki", so all references herein to "kabayaki" or "spitchcock" shall be to the same product having the same ingredients, as set forth herein.

In order to achieve the above-described objective, a spitchcock sauce is added to and mixed with a minced meat ingredient prepared by the method described in Japanese Laid-Open Publication No. 2013-102703 to make a flesh-like tissue meat. In addition, two types of minced meat A and minced meat B with different addition amounts of squid ink dye are prepared, which will be skin-like meat tissue meat. For example, as shown in FIG. 1, the minced meat A is arranged on both sides, and the minced meat B is arranged in the center portion to form the minced meat A and minced meat B into a belt shape. Preferably, without limitation, the squid ink content of the minced meat A is 0.27%, and the squid ink content of the minced meat B is 0.05%. In addition, typically, the thickness of a lower layer consisting of the minced meat A and the minced meat B is about 2 mm, and the width thereof is about 80 mm; however, those skilled in the art can optionally select the thickness and width.

Next, an upper layer of the prepared flesh-like tissue meat as described above is placed on an upper surface of these meats, as shown in FIG. 2 for example, to be shaped, and the meats are entirely scored using a scoring roller or the like. Then, the meats are cut to, for example, a length of about 130 mm. Next, the cut meats are, steamed for about 30 minutes in a usual manner and then cooled down. A sauce is applied to the meats, and the meats are optionally cooked, and the sauce is applied again, thereby obtaining a spitchcock-like fish meat paste product.

The spitchcock-like products made by the present invention (eel, sea eel, and other products) are extremely similar to real spitchcocks in terms of the external appearance, taste, flavor, mouth feel and the like. The raw ingredients thereof are comparatively inexpensive, which enable mass production, which cause no resource-related problems, and which have a great industrial value.

For example, the present invention provides the following.

(Item 1)

A spitchcock-like fish meat paste product comprising a lower layer
and an upper layer,
the upper layer comprising:
   (1) fish meat;
   (2) glucomannan;
   (3) salt;
   (4) transglutaminase;
   (5) an alkaline agent;
   (6) cooking oil or avocado paste; and
   (7) spitchcock sauce, and
the lower layer comprising:
   (1) fish meat;
   (2) glucomannan;
   (3) salt;
   (4) transglutaminase;
   (5) an alkaline agent;
   (6) cooking oil or avocado paste;
   (7) spitchcock sauce; and
   (8) squid ink,
wherein the lower layer is in a belt shape, and comprises a center portion extending in a longitudinal direction and an end portion arranged on both sides of the center portion, and wherein a squid ink concentration of the center portion is lower than a squid ink concentration of the end portion.

(Item 2)
A method for making a spitchcock-like fish meat paste product comprising a lower layer and an upper layer, comprising the steps of:
(a) mixing and stirring glucomannan and water to prepare mannan paste;
(b) mixing minced fish meat with salt, to be rubbed with the salt;
(c) adding transglutaminase and water to the mixture that was rubbed with salt in the step (b), and grinding the mixture to prepare minced fish meat paste;
(d) mixing an alkaline agent with the mannan paste that was prepared in the step (a);
(e) mixing the following:
  the mixture of the step (d);
  the minced fish meat paste prepared in the step (c);
  cooking oil or avocado paste; and
  spitchcock sauce,
to prepare flesh-like tissue meat;
(f) adding squid ink dye to the flesh-like tissue meat to prepare skin-like meat A and skin-like meat B, wherein a concentration of squid ink included in the skin-like meat A is higher than a concentration of squid ink included in the skin-like meat B;
(g) forming a belt-shaped lower layer with the skin-like meat B as a center portion extending in a longitudinal direction and the skin-like meat A as an end portion arranged on both sides of the center portion;
(h) arranging the flesh-like tissue meat, as an upper layer, on an upper surface of the lower layer;
(i) scoring an upper surface of the upper layer; and,
(j) heating the fish meat paste product of the step (i) and then leaving the product standing to cool down to make a steamed-type spitchcock product.

(Item 3)
The method according to claim 2, further comprising the steps of:
(k) browning the steamed-type spitchcock product that is made in the step (j); and
(l) applying sauce to a lower surface of said lower layer to make a spitchcock-like product.

(Item 4)
The method according to claim 2 or 3, wherein a concentration of said glucomannan in said mannan paste is 2 to 3% by weight.

(Item 5)
The method for making a fish meat paste product according to any one of claims 2 to 4, wherein 0.01 to 0.2% by weight alkaline agent is mixed with said mannan paste.

(Item 6)
The method for making a fish meat paste product according to any one of claims 2 to 5, wherein 3 to 12% by weight said cooking oil or avocado paste is mixed with said mixture.

Effects of Invention

A fish meat paste product which is soft and highly preferable like the meat of eel, in terms of taste and flavor, and a method for making the fish meat paste product are provided.

EMBODIMENTS FOR CARRYING OUT THE INVENTION

Figure 1:
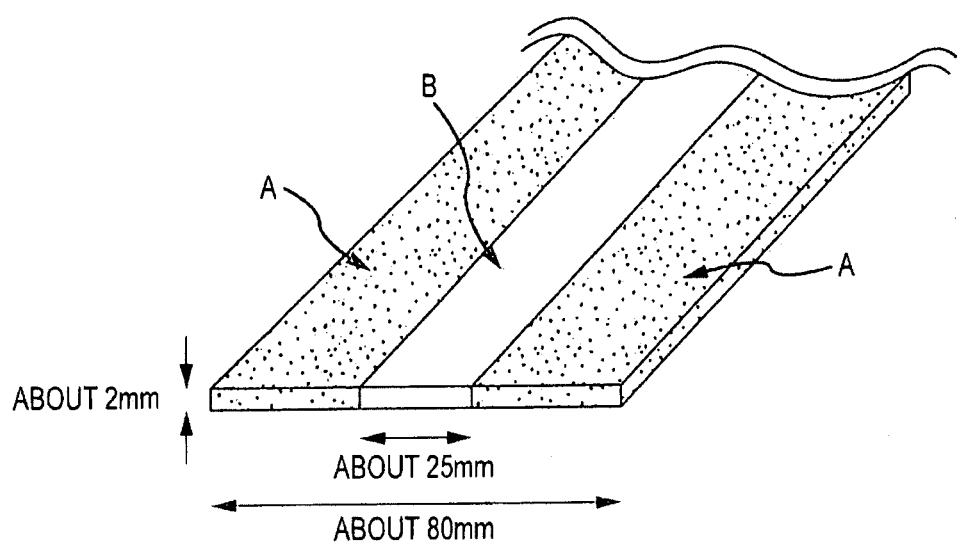
FIG. 1 is a diagram schematically showing a lower layer of a spitchcock-like fish meat paste product according to the present invention. The lower layer is in a belt shape, and also comprises a center portion (B) extending in a longitudinal direction and an end portion (A) arranged on both sides of the center portion, wherein a squid ink concentration of the center portion is lower than a squid ink concentration of the end portion.

The method for making a spitchcock-like fish meat paste product according to the present invention comprises a step of mixing glucomannan and water to obtain mannan paste.

As for the glucomannan as used herein, commercially available glucomannan powder, which is well known as a raw ingredient of konjak, or commercially available powdered glucomannan, obtained by adding an organic solvent such as alcohol to a glucomannan aqueous solution, followed by precipitation, and from which a low molecular portion is excluded, can be used.

In forming each commercially available, powdered glucomannan into an aqueous solution, while there is no particular limitation to the concentration of glucomannan, it is usually appropriate to define it to be 1.5 to 5% by weight. In particular, the range between 1.8 to 3% by weight is preferable in carrying out the present invention.

In addition, dissolution of the powdered glucomannan into water may be performed in accordance with a usual manner. The powdered glucomannan may be added and mixed with water which is prepared to be at 10 to 40° C., followed by standing for about fifteen hours under refrigerated conditions (4 to 10° C.), thereby obtaining viscous mannan paste.

Next, 0.01% by weight or greater, and preferably 0.03 to 0.1% by weight of alkaline agent is added to the mannan paste, followed by stirring and mixing to obtain the mixture.

Sodium hydroxide, calcium hydroxide, calcium oxide and the like are suitable as the alkaline agent. In consideration of work time in a later step, or a step of mixing with minced fish meat paste, the use of calcium hydroxide is most preferable.

While the addition amount the alkaline agent is adjusted in accordance with a blending amount of minced fish meat paste to be mixed, it is preferable to add an amount of alkaline agent that corresponds to range of 1 to 4% by weight in relative to the above-used powdered glucomannan. If the addition amount of the alkaline agent is too little, the time required to complete the gelatinization will be longer. On the other hand, if the addition amount is too much, the time required to complete the gelatinization will be shorter, which may cause an adverse effect of difficulty in work for mass production or the like.

Next, the minced fish meat is rubbed with salt, followed by adding transglutaminase and water and grinding, thus obtaining minced fish meat paste. Optionally, it is also possible to further add a substance selected from the group consisting of processed starch, trehalose, and seasoning.

As to the minced fish meat as used herein, those broadly used for raw ingredients of fishery paste products are suitable. For example, commercially available minced meat can be used for the minced fish meat, and one type of or two or more types of minced meat made with a usual manner, including croaker, walleye pollack, lizardfish, horse mackerel, mackerel, sardine, flatfish, golden threadfin bream, alfonsin, Atka mackerel, codfish, merluza and the like, can be used. Preferably, it is preferable to use 50% or more minced meat of walleye pollack.

It should be noted that the minced fish meat includes: rough minced meat obtained by separating flesh portion from a fish body, crushing the flesh portion, dispersing the crushed flesh portion into water and removing water-soluble protein; salt-rubbed minced meat obtained by adding salt to the rough minced meat and further grinding it; and frozen minced meat obtained by freezing such minced meats.

As to the amount of transglutaminase use, 0.01 to 100 units, and preferably 0.1 to 50 units may be added per 1 g of protein contained in the raw ingredient of the paste product.

The blending amount of the minced fish meat paste is preferably 30 to 40% by weight to mannan paste. If the blending amount of the minced fish meat paste is less than 30% by weight to mannan paste, then the mouth feel will be soft. On the other hand, if the blending amount exceeds 40% by weight, then the mouth feel will be rather hard, resulting in not obtaining a targeted mouth feel.

In the present invention, hereinafter, (1) mixture of mannan paste and alkaline agent, (2) minced fish meat paste, (3) cooking oil and/or avocado paste, and (4) spitchcock sauce, will be added and mixed together to prepare flesh-like tissue meat. The blending amount of the cooking oil and/or avocado paste is 3% by weight or more, and preferably 3 to 12% by weight, in relative to the flesh-like tissue meat.

If the blending amount of the cooking oil is less than 3% by weight, then the meat will have a mouth feel similar to that of ordinary steamed fish paste, resulting in not obtaining a targeted mouth feel. If the blending amount exceeds 12% by weight, then the mouth feel will be soft. As for the cooking oil, it is suitable to use soybean oil, rapeseed oil, cacao butter, palm oil, lard and the like.

Instead of cooking oil, it is also possible to use avocado paste. In addition, it is possible to use a mixture of cooking oil and avocado paste. When avocado paste is used, there will be an advantage of creating a healthy image due to vitamins and minerals contained therein.

In carrying out the present invention, in a step of obtaining a mixture such as a mixture of minced fish meat paste and mannan paste, such pastes may be stirred and mixed together in accordance with a usual manner to obtain an even mixture.

The spitchcock sauce used in carrying out the present invention typically includes fermented seasoning, sugar, starch syrup, and soy sauce. It is also possible to use commercially available spitchcock sauce. In addition to spitchcock sauce, seasoning may be optionally added in an appropriate fashion. In addition, processed starch and/or trehalose may be added.

The squid ink used in carrying out the present invention is available from Taisho Technos Co., Ltd. Alternatively, the squid ink used in carrying out the present invention can be prepared with a usual manner for example.

Squid ink dye is added to the obtained flesh-like tissue meat to prepare skin-like meat A and skin-like meat B. The concentration of the squid ink included in the skin-like meat A is higher than the concentration of the squid ink included in the skin-like meat B. Typically, the concentration of the squid ink included in the skin-like meat A is, without limitation, 0.20% by weight to 0.40% by weight, and preferably 0.25% by weight to 0.30% by weight. Typically, the concentration of the squid ink included in the skin-like meat B is, without limitation, 0.02% by weight to 0.08% by weight, and preferably 0.04% by weight to 0.06% by weight.

Figure 2:
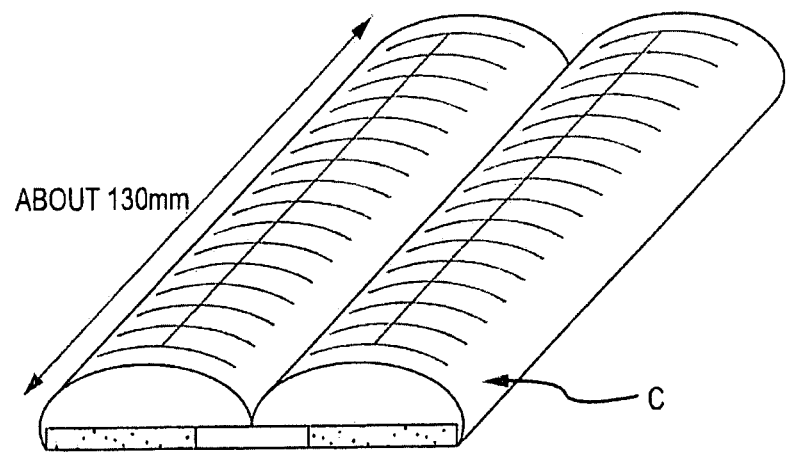
FIG. 2 is a diagram schematically showing a spitchcock-like fish meat paste product according to the present invention, in which an upper layer (C) is arranged on an upper surface of a lower layer.

A belt-shaped lower layer is formed with the skin-like meat B as a center portion of the lower layer extending in a longitudinal direction (e.g., B in FIG. 1), and with the skin-like meat A as an end portion arranged on both sides of the center portion (e.g., A in FIG. 1). Next, the flesh-like tissue meat is arranged, as an upper layer (e.g., C in FIG. 2), on an upper surface of the lower layer. Optionally, the upper surface of the upper layer is scored.

Further, a product made by arranging the flesh-like tissue meat, as an upper layer, on the upper surface of the lower layer, or a product made by further scoring the upper surface of the upper layer, is heated and then is stood to cool down, to make a steamed-type spitchcock product. When heated, the product is placed in a plastic, metal or other heating container with heat resisting properties, to be heated and steamed at the temperature ranging between 90° C. and 100° C. for 20 to 40 minutes, to promote gelatinization fully.

Optionally, the steamed-type spitchcock product, which has been made by heating and steaming as described above, is browned. Further, optionally, sauce is applied to the lower surface of the lower layer, thus making a spitchcock-like product.

A preferable method for making a fish meat paste product according to the present invention comprises: adding 0.01% to 0.2% by weight of alkaline agent to mannan paste with glucomannan concentration of 2 to 3% by weight, to be mixed together; mixing minced fish meat paste that has been prepared with about 50% minced fish meat (paste to which transglutaminase was added during the salt-rubbing) in the ratio of 25 to 45% by weight, with the mixture; and then mixing 3% by weight or more cooking oil with the mixture.

The thus obtained fish meat paste product according to the present invention is such a fish meat paste product obtained by forming and heating a fish meat-containing mannan paste containing fish meat, glucomannan, salt, transglutaminase, an alkaline agent, and cooking oil.

A preferable blending ratio is as follows: 9.3 to 14.5% by weight fish meat, 1.35 to 2.50% by weight glucomannan, 0.3 to 0.5% by weight salt, 0.01 to 0.02% by weight transglutaminase, 0.03 to 0.04% by weight calcium hydroxide, and 5.9 to 6.8% by weight cooking oil. Still preferably, the blending ratio is as follows: 10.7 to 13.0% by weight fish meat, 1.4 to 2.2% by weight glucomannan, 0.39 to 0.48% by weight salt, 0.01 to 0.02% by weight transglutaminase, 0.03 to 0.04% by weight calcium hydroxide, and 6.0 to 6.5% by weight cooking oil.

EXAMPLES

Hereinafter, the present invention will be described in detail with reference to Examples. Note that the present invention is not limited to the present Examples.

Example 1

Sixty-four grams glucomannan and 3,000 ml water were stirred well with each other to obtain 3,064 g uniform mannan paste. After preparing the mannan paste, it was stood for 15 hours under refrigeration conditions (5° C.).

Apart from the mannan paste, 500 g minced fish meat was rubbed with 18 g salt. Then, 120 g processed starch, 90 g trehalose, 35 g seasoning, 0.6 g formulation with transglutaminase activity of 35 to 86 U/g, and 240 g cold water were added to the mannan paste, followed by grinding until the mannan paste became uniform, thus obtaining about 1,000 g minced fish meat paste.

Next, 1.5 g calcium hydroxide was added to 3,064 g of the obtained mannan paste as described above, followed by mixing until the paste became uniform. Then, 1,000 g of the previously-mentioned fish meat paste was added to and mixed with the mixture; and 280 g cooking oil and 110 g spitchcock sauce were further added, followed by mixing until the mixture became uniform. This mixture was made into flesh-like tissue meat.

Next, 1.35 g squid ink dye (Taisho Technos Co., Ltd) was added to 600 g of the flesh-like tissue meat to obtain skin-like meat A. Further, 0.25 g squid ink dye was added to 600 g of the flesh-like tissue meat to obtain skin-like meat B. Then, the skin-like meat B was arranged at the center portion (with the width of about 2.5 mm), and the skin-like meat A was arranged on both sides to form a belt shape (with the overall width of 80 mm and thickness of about 2 mm) (see FIG. 1).

Next, the flesh-like tissue meat ("C" in FIG. 2) was placed on the upper surfaces of the meats, and the upper surface of the flesh-like tissue meat was scored using a scoring roller.

Slices of about 130 mm that were cut from the meat were heated at 90° C. for 20 minutes, and then stood to cool down. Then the slices were packaged, thus obtaining a steamed-type spitchcock product.

Further, both surfaces of the hot-formed product were browned using a Schwank, and sauce was applied on the lower surface. Then, the product was packaged, thus obtaining a spitchcock-like product.

From the foregoing, while a specific embodiment of the present invention is described herein for the purpose of exemplification, it is apparent that various modifications can be made without departing from the intention and scope of the present invention. Accordingly, the present invention is not limited except as defined in the appended claims.

INDUSTRIAL APPLICABILITY

A fish meat paste product that is soft and highly preferable like the meat of eel in terms of mouth feel and flavor, and a method for making the fish meat paste product, are provided.

What is claimed is:

1. A kabayaki-like fish meat paste product comprising a lower layer and an upper layer,
    the upper layer comprising:
    (1) fish meat;
    (2) glucomannan;
    (3) salt;
    (4) transglutaminase;
    (5) an alkaline agent;
    (6) cooking oil or avocado paste; and
    (7) kabayaki sauce, and
    the lower layer comprising:
    (1) fish meat;
    (2) glucomannan;
    (3) salt;
    (4) transglutaminase;
    (5) an alkaline agent;
    (6) cooking oil or avocado paste;
    (7) kabayaki sauce; and
    (8) squid ink,
        wherein the lower layer is in a belt shape, and comprises a center portion extending in a longitudinal direction and an end portion arranged on both sides of the center portion, and wherein a squid ink concentration of the center portion is lower than a squid ink concentration of the end portion.

2. A method for making a kabayaki-like fish meat paste product comprising a lower layer and an upper layer, comprising the steps of:
    (a) mixing and stirring glucomannan and water to prepare mannan paste;
    (b) mixing minced fish meat with salt, to be rubbed with the salt;
    (c) adding transglutaminase and water to the mixture that was rubbed with salt in the step (b), and grinding the mixture to prepare minced fish meat paste;
    (d) mixing an alkaline agent with the mannan paste that was prepared in the step (a);
    (e) mixing the following:
        the mixture of the step (d);
        the minced fish meat paste prepared in the step (c);
        cooking oil or avocado paste; and
        kabayaki sauce,
    to prepare flesh-like tissue meat;
    (f) adding squid ink dye to the flesh-like tissue meat to prepare skin-like meat A and skin-like meat B, wherein a concentration of squid ink included in the skin-like meat A is higher than a concentration of squid ink included in the skin-like meat B;
    (g) forming a belt-shaped lower layer with the skin-like meat B as a center portion extending in a longitudinal direction and the skin-like meat A as an end portion arranged on both sides of the center portion;
    (h) arranging the flesh-like tissue meat, as an upper layer, on an upper surface of the lower layer;
    (i) scoring an upper surface of the upper layer; and,
    (j) heating the fish meat paste product of the step (i) and then leaving the product standing to cool down to make a steamed-type kabayaki product.

3. The method according to claim 2, further comprising the steps of:
    (k) browning the steamed-type kabayaki product that is made in the step (j); and
    (l) applying sauce to a lower surface of said lower layer to make a kabayaki-like product.

4. The method according to claim 2, wherein a concentration of said glucomannan in said mannan paste is 2 to 3% by weight.

5. The method for making a fish meat paste product according to claim 2, wherein 0.01 to 0.2% by weight alkaline agent is mixed with said mannan paste.

6. The method for making a fish meat paste product according to claim 2, wherein 3 to 12% by weight said cooking oil or avocado paste is mixed with said mixture.

7. The kabayaki-like fish meat paste product according to claim 1, comprising 9.3 to 14.5% by weight fish meat, 1.35 to 2.50% by weight glucomannan, 0.3 to 0.5% by weight salt, 0.01 to 0.02% by weight transglutaminase, 0.03 to 0.04% by weight alkaline agent, and 5.9 to 6.8% by weight cooking oil or avocado paste.

8. The kabayaki-like fish meat paste product according to claim 1, wherein the alkaline agent is calcium hydroxide.

9. The kabayaki-like fish meat paste product according to claim 8, comprising 10.7 to 13.0% by weight fish meat, 1.4 to 2.2% by weight glucomannan, 0.39 to 0.48% by weight salt, 0.01 to 0.02% by weight transglutaminase, 0.03 to 0.04% by weight calcium hydroxide, and 6.0 to 6.5% by weight cooking oil or avocado paste.

10. A kabayaki-like fish meat paste product made by the method according to claim 2.

* * * * *